United States Patent [19]

Oman et al.

[11] 4,075,500
[45] Feb. 21, 1978

[54] VARIABLE STATOR, DIFFUSER AUGMENTED WIND TURBINE ELECTRICAL GENERATION SYSTEM

[75] Inventors: Richard A. Oman, Huntington; Kenneth M. Foreman, North Bellmore, both of N.Y.

[73] Assignee: Grumman Aerospace Corporation, Bethpage, N.Y.

[21] Appl. No.: 604,466

[22] Filed: Aug. 13, 1975

[51] Int. Cl.² ............................................. H02P 9/04
[52] U.S. Cl. ................................. 290/55; 415/DIG. 1; 415/147; 415/2
[58] Field of Search ................... 290/43, 44, 54, 55; 415/DIG. 1, 146, 147, 161, 2, 3, 4; 416/85

[56] References Cited

U.S. PATENT DOCUMENTS

| 2,351,203 | 6/1944 | Hanson | 415/146 |
| 3,442,493 | 5/1969 | Smith | 415/161 |

FOREIGN PATENT DOCUMENTS

| 567,272 | 5/1958 | Belgium | 415/DIG. 1 |
| 559,239 | 11/1922 | France | 415/2 |
| 560,391 | 12/1922 | France | 416/85 |
| 1,009,350 | 5/1957 | Germany | 415/161 |
| 545,587 | 3/1942 | United Kingdom | 415/161 |
| 893,054 | 4/1942 | United Kingdom | 415/161 |

*Primary Examiner*—Robert K. Schaefer
*Assistant Examiner*—John W. Redman
*Attorney, Agent, or Firm*—Richard G. Geib; Mellor A. Gill

[57] ABSTRACT

A wind powered electrical generating system having a suitable shaped aerodynamic duct or shroud within which a wind turbine having a fixed pitch blade is mounted, as by means of a stator means at the inlet of the duct or shroud with the stator means including mechanism for varying their effective angle of attack with regard to the approaching wind so as to provide the desired swirling approach of the wind to the turbine therebehind in achieving the desired torque and speed of shafting from the turbine to generator driven by the turbine in maintaining constant phase and frequency of the electrical output wherein the duct or shroud is mounted by a tower or shaft that will permit the cocking of the structure into the wind.

7 Claims, 8 Drawing Figures

VARIABLE STATOR, DIFFUSER AUGMENTED WIND TURBINE ELECTRICAL GENERATION SYSTEM

SUMMARY

A background summarization of the utilization of wind for generating electrical power has been documented in a NASA publication entitled "The Development of Wind Powered Installations For Electrical Power Generation In Germany", U. Hutter, NASA TTF-15,050 National Aeronautical and Space Administration, Washington, D.C. 20546, August 1973. Suffice it to say, one of the oldest methods of extracting useful energy from natural phenomenon is by means of bladed rotating machinery (wind turbines, commonly referred to as windmills, exposed to the wind). However, there still remains a major unresolved technical problem in the design of conventional wind turbines for a very large power system in regard to the blade dynamics of large diameter rotors. The increased blade length of larger rotors requires greatly increased blade stiffness and reduced weight in order to insure that critical vibrational frequencies of the blade remain sufficiently above the excitation frequencies associated with operation that the blades do not become unstable. This stringent stiffness-to-weight requirement causes cost to grow rapidly with diameter; eventually the design becomes prohibitive beyond some diameter. Because of this fact, integration of wind generators into a national or regional power grid is inhibited by the unacceptable unreliability of very large units or the economic liability of many smaller units of comparable total power output. This technical factor interacts with the economic constraints associated with matching supply and demand schedules in variable wind, the low power density of wind, the high development risk of a new system concepts, and the capital-intensive nature of wind powered systems.

Additionally, the natural variability of wind requires mechanically complex and expensive rotor speed and pitch and control mechanisms for conventional wind turbine machines to provide high operating efficiency over a wide range of wind speeds. These pitch controls represents a large fraction of the total cost of the rotor system; not only in the direct cost of the control mechanisms, but also in their impact on other system costs such as maintenance, reliability, and unpredictable aggrevation of blade instabilities because of mechanical freedom in the blade rotor and hub. The effects of this mechanical freedom are particularly disconcerting because there is no way they can be simulated speciously in small-scale rotors. Consequently, a large development risk element due to the presence of pitch control will be a factor in any large prototypes that are blade-dynamics limited. Even with a substantial degree of pitch control the rotor speed will often vary from a constant design level. To synchronize with a power grid the variable rotor speed required either an unacceptable narrow range of wind speed for power production, a separate expensive conversion and synchronization system, or a very sophisticated generator concept that has never been made in large sizes. Apart from the synchronization problem, the low speed cut-in and high speed cut-out limitation on use of conventional rotors reduces the opportunities to operate in the full annual spectrum of wind power and either increases the storage requirement or diminishes the value of the wind power system.

It is well known now that the change of wind momentum by aerodynamic forces on the rotor blades is limited in energy output by several factors. First, the ideal efficiency is limited to about 0.593 of the wind power per unit area by the unavoidable shedding of flow around the tip of the rotor. Secondly, occasional extremes of wind speeds can lead to destruction of the rotor blades, unless controls be employed to reduce the geometric obstruction presented by the rotor. This control measure limits maximum output to be expected from a wind turbine. Thirdly, the aerodynamics of the tower supporting the wind driven rotor must be taken into account in the design of the blades whether located ahead of or behind the rotor to the deteriment of structural cost to accommodate the aerodynamic loading such structures create.

It has long been thought that substantial performance advantages could be realized by the use of a shroud and diffuser on a wind turbine (see "A Preliminary Report on Design and Performance of Ducted Windmills", G.N.M. Lilley and W. J. Rainbird, the British Electrical and Allied Industries Research Association, Great Britian, Technical Report C/T119, 1957). Prior work indicated that the diffuser augmented turbines could produce up to twice the power of unshrouded turbines of the same diameter. Thus, over the years, many groups have become interested in the diffuser-augmented windmills, but they have always dropped the idea because the diffuser has to be so much larger than the windmill rotor that the system has been heretofore considered economically impractical. Such logic left no alternative but to turn to the large free standing rotor blades with little thought to what has and is demonstrable by this invention to be an improvement to the prior art providing compact apparatus giving efficient performance at precisely constant rotational speeds over a broad wind range with regard to a structure that those skilled in the art heretofore thought impossible to obtain.

A more particular object of the invention is to provide a controllable stator, diffuser augmented wind turbine electrical generating means operable between a very low wind velocity and a very high wind velocity which eliminates a need for rotor blade pitch change mechanism, thereby saving as much as 20% of system cost as well as eliminating problems of reliability and maintenance; and which, because of constant rotor speed enables direct connection of the generator to a power grid, will produce a rigorously synchronized AC current for connection to existing line systems in meeting their requirements without a reduction of rotor efficiency whereby a higher production yield per cost of installed equipment is obtainable.

A still more particular object of this invention is to utilize in a wind turbine for generating electricity a plurality of supporting stators having movable trailing edge flaps such that the incoming air may be deflected in such a way that a turbine rotor with fixed blades therebehind will operate at a high aerodynamic efficiency and a constant rotational speed throughout a range of useable wind speeds such that an AC generator of synchronized type may be adapted thereto as a one piece unit which is capable of being locked in phase with a power grid that it is to feed without the need of expensive conversion equipment all of which is within a duct or shroud that will be operative as a diffuser to increase the power output by the creation of a negative pressure at the turbine rotor's exhaust plane.

Another and further object of this invention is to provide a monolithic rotor for a wind turbine generating system, that will save on construction and maintainence costs, with adaptation to variable wind velocity to be achieved by controllable stators, that are static and lightly loaded components, arranged to deflect the incoming wind in a particular way, so as to approach the rotating blades at nearly optimum angles for aerodynamic performance regardless of wind velocity, by means of trailing edge flaps or rotatable means for the stator blades themselves so as to permit an easy integration of stator components in a diffuser-augmented wind turbine system that will, in addition, reduce noise transmission because of shadowing by the stator stage and the diffuser.

It is a still further and additional object of this invention to provide a controllable stator, diffuser augumented wind turbine powered generator system with boundary layer control in the diffuser to take advantage of the plentiful supply of high energy air just outside of the diffuser to provide simple and effective means to reduce diffuser size without performance penalty.

PRIOR ART

The closest known patented device would appear to be presented by the Nelson U.S. Pat. No. 2,815,188 and the Wagner U.S. Pat. No. 2,962,258 showing ram air turbines mounted within ducts or shrouds which are totally unrelated to any diffuser concept with which this invention is concerned but which are provided with stator vanes behind the turbines which have controllable portions whose angles may be varied for valving the amount of exhaust air from the rotor blades therebefore. Other prior art patents showing shrouded wind turbines are U.S. Pat. Nos. 1,783,669; 2,017,961; 2,339,078; 2,517,135 and 2,563,279. A publication of interest to show the use of the diffuser shrouds to augment the flow through a wind turbine by recovery of excess connected energy was known to have been explored in 1929, (See "Energieumsetzungen In Venturidusen", A. Betz, Naturwissenshaften, 10, S.3, TPP. 160–164, 1929). More recent studies ("Shrouds For Auto Generator", O' Igra, Report No. 2, Department of Mechanical Engineering, Ben Gurion University of the Negev, Beersheva, Israel, March 1975) relates to the effect of the greatly depressed pressure level caused by downstream entrainment at the exit plane of a diffuser. To these publications within the Prior Art must also be added the aforementioned report of G.N.M. Lilley et al.

To these patents and publications some may wish to erroneously add the prior art with regard to variable stator vanes for the inlet to gas turbine compressors. However, it should be soon recognized by those skilled in the art with which this invention relates that the problem for controlling compressor loading, to which such inventions relate, as may be readily seen in the Pike et al U.S. Pat. No. 3,483,881, could not be reasonably related to this invention by one so skilled in the art. Among other differences, controlling compressor loading requires matching to a variable load, whereas controlling a wind turbine requires matching to a variable energy supply (i.e., the wind kinetic energy). This is illustrated by the prior art above in that even though both the shrouded wind turbine and variable inlets for compressors are very old in the art the only suggestion for controlling shrouded wind turbines is in regard to its exhaust flow and not its inlet wind vector.

DRAWING DESCRIPTION

DETAIL DESCRIPTION

Figure 1:
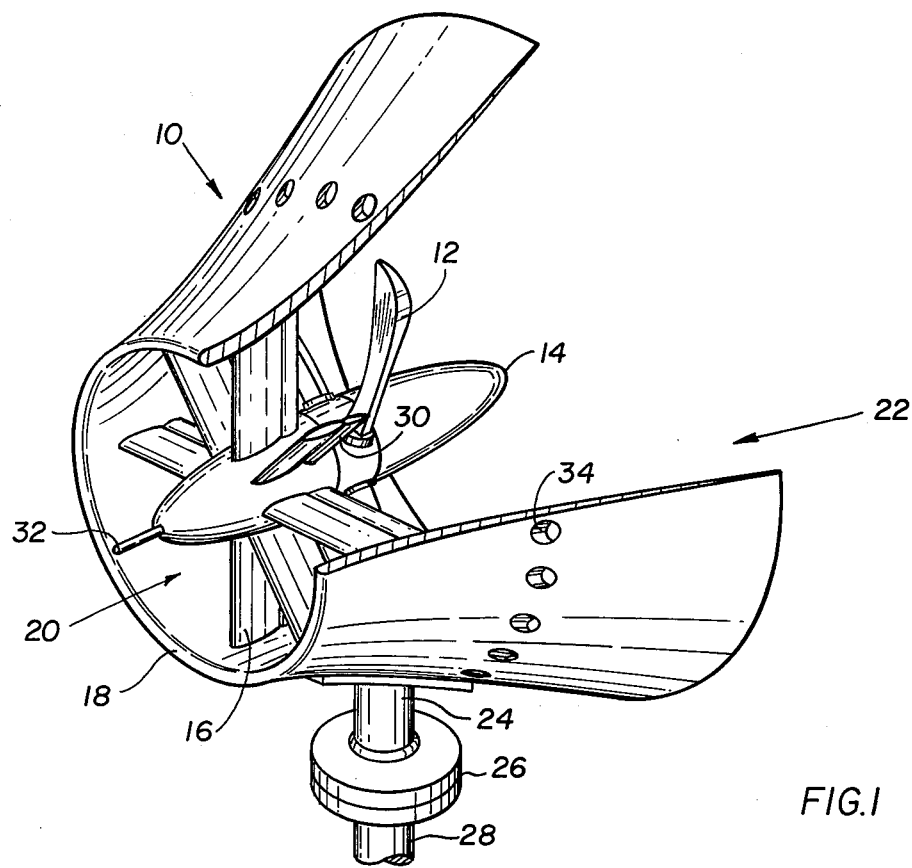
FIG. 1 is an isometric sketch of an wind turbine electrical generating system mounted upon a mast so as to be self-cocking into the wind.

The diffuser augmented wind turbine 10 shown by FIG. 1 is inclusive of a wind rotor 12 rotatably supported by a faired body 14 that is in turn supported by stators 16 within a diffuser shaped duct or shroud 18. The shroud or duct 18 is designed so as to have an outlet to inlet diameter ratio greater than one, which in the case of a 100 foot rotor 12 will mean an inlet 20 of somewhat greater then 100 feet in diameter and an outlet 22 of substantially greater than 100 feet in diameter. The duct or shroud 18 is mounted by a mast 24 to a rotatable joint 26 on a tower 28 so as to be selfcocking into the direction of the wind.

The stator blades have trailing edge flaps 30 to preswirl the incoming wind to a desired angle of incidence and degree of swirl upon the rotor blades 12. A pressure sensitive probe 32 is shown mounted to the faired body 14 which is sensitive to the incoming wind for controlling the position of the trailing edge flap 30. The pressure sensitive probe 32, as will be readily understood by those skilled in the art, may be mounted, at the inlet, to the periphery of the duct or shroud 18.

In order to avoid ducting flow problems and enable the shortest possible diffuser duct or shroud 18, a plurality of holes 34, which could be slots or similar type preforations, are provided through the wall of the duct or shroud 18 to allow external flow to enter and energize the boundary layer along the wall of the diffuser.

Figure 2:
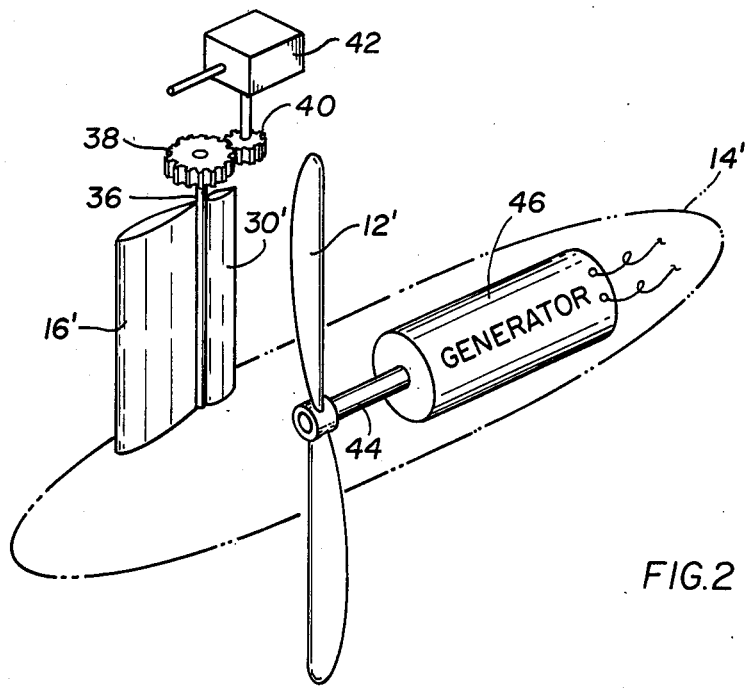
FIG. 2 is a schematic illustration of a wind turbine generator system shown by FIG. 1.

FIG. 2 is a schematic illustration of the operative structure of FIG. 1 showing the rotor 12' behind stators 16' on which are hinged trailing edge flaps 30'. The trailing edge flaps are connected by a hinged pin 36 to gear 38 that is rotated by a gear 40 driven by a wind pressure and/or velocity sensitive means 42 to provide the proper approach and pre-swirling of the incoming wind to rotate the rotor in such a way as to develop the proper torquing of shaft 44 driving generator 46 of the synchronous type. Reference may be made to the text book, *ELECTRICAL ENGINEERING, THEORY AND PRACTICE*, by W. H. Erickson and N. H. Brian, second edition, 1959, John Wiley and Sons, Inc., New York, Chapter 17 explaining a synchronous generator to be one which will develop a torque that will oppose the rotation thereof in accordance with the position of its rotor with respect to its stator conductors as well as the stator current and the rotor flux. And when the generator-voltage vector reaches a torque equilibrium position, the generator rotor will rotate at a synchronous speed. It is in the realization of the attributes of synchronous generator 46 when coupled with a wind turbine 12', as by shaft 44, to be driven thereby that the use of the trailing edge flaps 30' of the stators 16' will permit the developed torque to equal the retarding torque to maintain the generator speed constant. This is accomplished by the use of wind pressure and/or velocity sensing means in the control 42 for controlling the rotation of gear 40 and gear 38 to move the trailing edge flaps 30' to the proper angle with respect to the stator 16'. This is a very important attribute of the present invention in that speed constancy simplifies frequency control phase matching for the generator electrical power with a simple feedback circuit controlling the field current in the generator/alternator.

Figure 3:
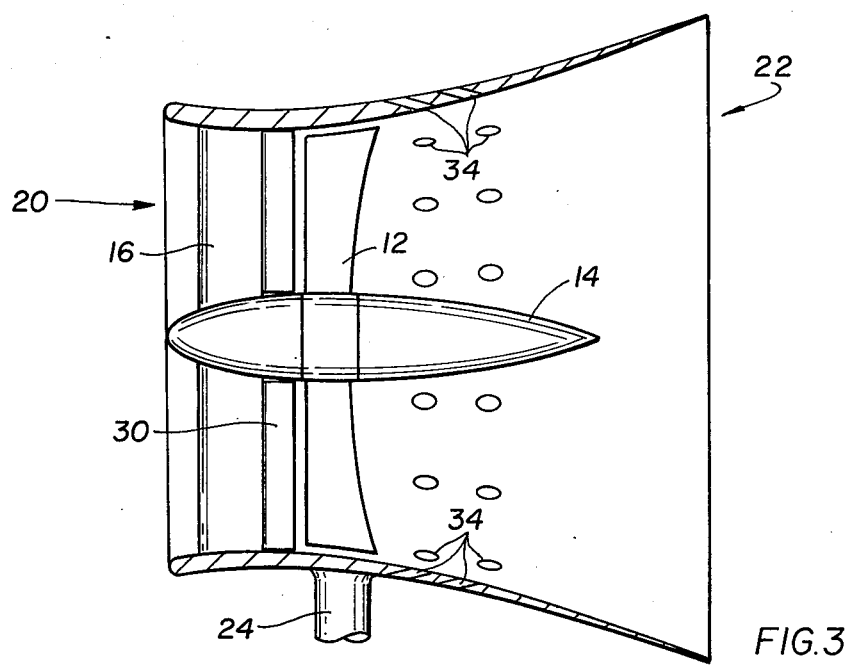
FIG. 3 is a cross-sectional view of the structure of FIG. 1.

With reference now to FIG. 3 the diffuser augmented wind turbine of FIG. 1 is shown in cross-sectional detail so as to provided a better idea of how the boundary layer control slots 34 cooperate with the air flow through the diffuser. The slots allow flow of higher velocity external air flow towards the lower velocity diffuser flow to emerge along the walls of the diffuser behind the monolithic turbine 12. As a result the external air ingested within the diffuser acts to prevent separation and/or back flow that would interfere with the augmenting principals of the diffuser. Such boundary layer control slotting is shown in two places than the one location of FIG. 1 for further supplementation of flow.

Figure 4:
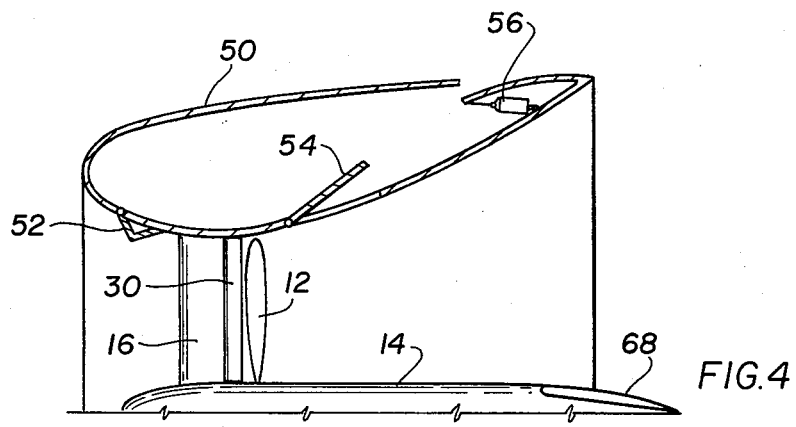
FIG. 4 is a partial cross-sectional view of an alternative embodiment.

FIG. 4 suggests an alternative for construction of the aerodynamic duct or shroud 50 so as to utilize inlet spoilers or boundary layer trips 52 and flow control doors 54 in combination with bleed off vent doors 56. It should be readily understood that such louvers and doors may be mechanically and electrically actuated from a stored position to an operative position, as shown.

Figure 5:
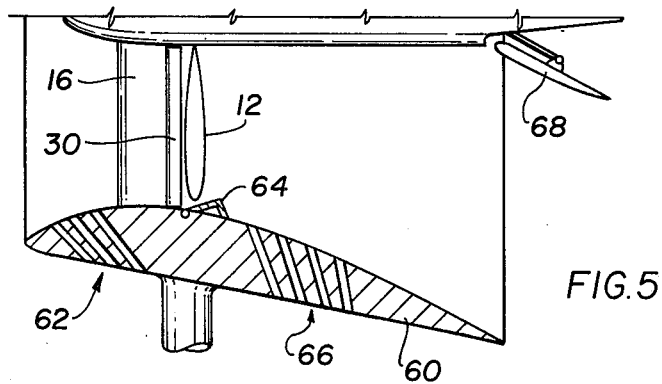
FIG. 5 is a partial cross-sectional view of still another embodiment.

In FIG. 5 shows a further alternative embodiment whereby the diffuser duct or shroud 60 is provided with vent louvers 62 at its inlet section, an exit spoiler or boundary layer trip 64 and exit vent louvers 66.

In addition diffuser flow control may also be provided extending center body 14 so as to accommodate flaps 68 at the trailing edge thereof. Flaps 68 are shown in the stored position in FIG. 4 and in the extended position in FIG. 5.

Figure 6:
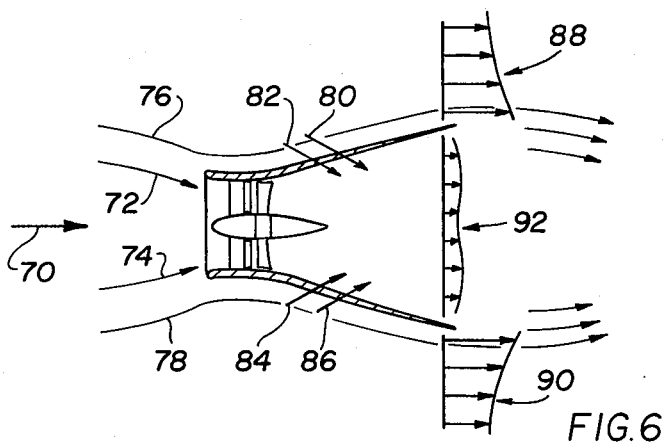
FIG. 6 is a schematic diagram of the flow field in and surrounding a diffuser augmented wind turbine.

FIG. 6 shows how the flow system in and around the diffuser augmented wind turbine is configured to reduce base pressure. In more detail the wind is approaching the device as indicated by the arrow 70 at a given velocity V and pressure P. A portion thereof represented by lines 72 and 74 is captured by the inlet of the device whereas the remaining portion as represented by lines 76 and 78 flows about the exterior of the device. As for the wind captured by the device it is redirected and pre-swirled by the trailing edge flap of the stator means and energy is extracted therefrom by the monolithic turbine so as to lower its pressure and velocity relative to the surrounding air stream represented by the lines 76 and 78. The diffuser duct or shroud by being expanded behind the turbine will further act to lower the pressure and velocity of the wind exhausted from the turbine such that augmentation is needed. This is done by introducing higher velocity and pressure boundary layer air, as by the arrows 80, 82, 84, 86 through the duct or shroud walls. This will permit an attachment of the air flow within the device to the walls of the diffuser for flow therealong to the exit plane wherein the flow from the device is augmented by the higher velocity and pressure exterior boundary layer flow. The pressure velocity relationship at the exit plane of the duct or shroud exteriorly and interiorly is represented by the arrows (items 88 and 90) exteriorly of the device and the arrows (item 92) interiorly thereof.

Figure 7:
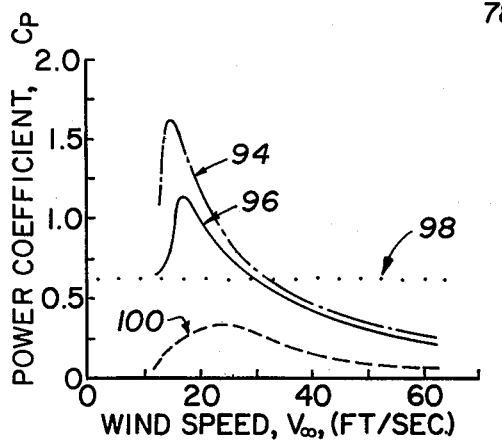
FIG. 7 is a graphical illustration of a diffuser augmented wind turbine performance in comparison with a rotor blade approach.

With reference now to FIG. 7 the power coefficient (conventionally defined and based on the aforesaid area) for a non-optimal system using two different values of base pressure coefficient, as well as the ideal conventional turbine (one having a power coefficient, of 0.593), is compared with a corresponding set of predictions derived from published characteristics of the NASA Lewis Research Center's 100 Kilowatt wind turbine generator (see "Plans and Status of NASA Lewis Research Center Wind Energy Project", Thomas, R. et al, NASA Technical Memorandum TWX 71-701, Sept. 28, 1975), and respectively shown by the traces 95, 96, 98, and 100. These traces are representative of the calculations derived from the expression $C_P = $ (rotor power)$/(\frac{1}{2}\rho V_\infty^3 A)$ where $V_\infty$ is the wind speed and A is the rotor area.

The diffuser pressure coefficient ($C_{p4} = (P_{exit} - P_\infty)/\frac{1}{2}\rho V_\infty^2$) for the non-optimal system represented by the trace 94 was $-0.5$ whereas for the trace 96 it was $-0.2$ using the structure of the disclosed invention. These calculations prove that the structure of this invention permits the extraction of power so that the device is easier to function at low mind speeds and operative over a wider range of wind speeds. Actually the graphs illustrate that the disclosed invention permits a drop in the power coefficient at high wind speeds equivalent to that of absolute power increasing somewhat slower than the square of the wind velocity.

Figure 8:
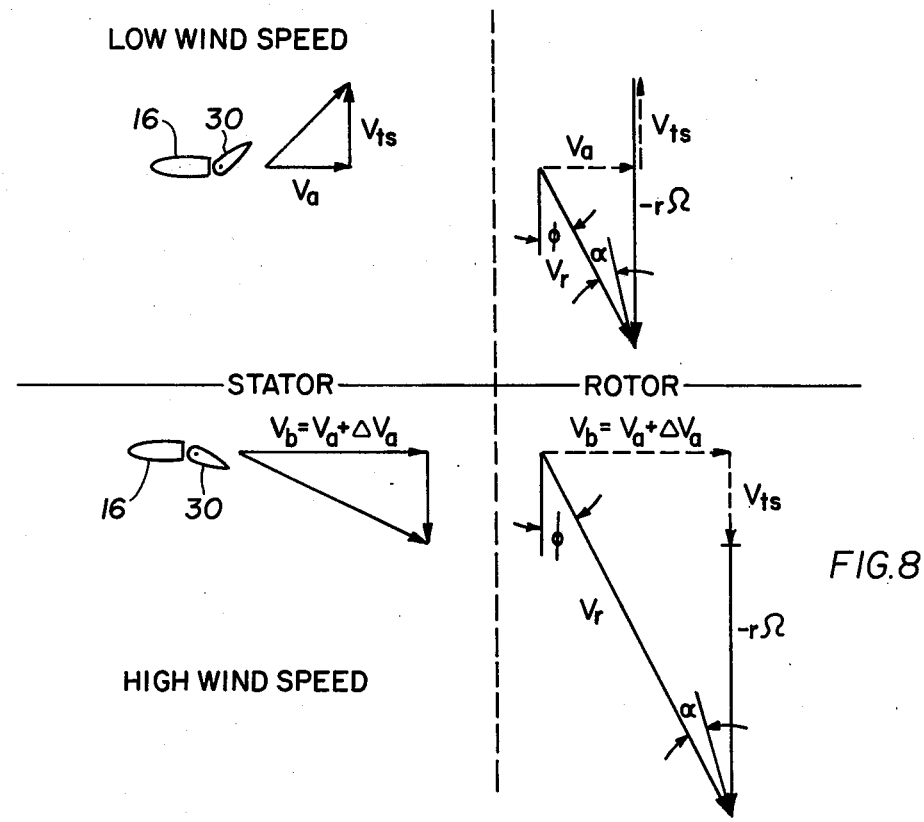
FIG. 8 are velocity diagrams of a two stage constant speed wind turbine in accordance with the principles of this invention.

As illustrated by FIG. 1 in the preferred embodiment, the stators 16 are symmetrical airfoils and support the trailing edge flap 30 by hinges so that the latter may be assigned different angles as the wind speed varies. At low wind speeds trailing flaps are operative so that air is deflected in the direction of rotor rotation; whereas at high winds the opposite occurs. The design algorithm is such that the rotor velocity triangle is exactly similar to the design triangle until the choosen stator flap deflection limits are reached. Outside those limits the velocity triangle of the rotor is allowed to change shape so that only then does departure from design lift coefficient occur on the rotor blades. FIG. 8 shows how the system maintains constant angle of attack and lift coefficient on the fixed-pitched rotor blades without changing rotational speed as the wind speed changes. With respect to the symbols used in these figures the following is true.

$V_a$ is the incoming axial velocity of the wind.

$V_{ts}$ is the tangential velocity of the wind as introduced by the stator $V_r$ is the resultant velocity of the wind as seen by the monolithic rotor.

$\phi$ is the angle between the resultant velocity and the plane of rotation of the rotor.

$\alpha$ is the angle of attack at any specific spanwise station made by the monolithic rotor blade with respect to the resultant velocity.

and $-r\Omega$ is the negative of the product of the radius at a particular spanwise station of the rotor blade and the rotational velocity of the monolithic rotor.

As such, FIG. 8 is representative of typical velocity triangles for different wind speeds. From these triangles it is easily represented that the rotor speed ($r\Omega$) at any given radial (span) position is the same for all wind speeds, and the rotor inflow angle ($\phi$, the angle between the resultant velocity and the plane of rotation of the turbine) remains nearly constant as the axial velocity ($V_a$ or $V_b$) through the monolithic rotor changes with wind speed. Therefore, stator flap movement capability of this invention can compensate for wind variability by giving a pre-swirl and incidence to the flow prior to the rotor; and high aerodynamic efficiency can be preserved throughout wide operational conditions with accompanying extended high efficiency power extraction. The major benefit of this feature to large wind power generation units is the ability to operate the monolithic turbine rotor at constant rotational speed without need for blade pitch change mechanisms. Constant rotational speed provides excellent electrical frequency regulation that assures direct acceptability of wind power into a regional power grid. Furthermore, fixed-pitch turbine blades means stronger and cheaper designs and constructions than with variable pitch turbine blades.

In essence, by employing stators with trailing edge flaps a means of wind adaptive control is added at a low cost. The stators are relative lightly stressed, non-rotating structural members that would ordinarily be needed to support the turbine within the duct, but have simple hinged flap sections that can be driven passively by aerodynamic balance, or actively by a complete control system that senses dynamic pressure.

As disclosed the rotor operates at a nearly constant disk loading, ($\Delta P/\frac{1}{2}\rho V_\infty^2$) through the central portion of the wind range and this produces nearly constant torque coefficient, (T $\frac{1}{2}\rho V_\infty^3$ R) for the fixed-pitch rotor, and as the rpm is constant, the power coefficient ($C_P$ = Rotor Power/$\frac{1}{2}\rho V_\infty^3$ A) varies roughly inversely with wind speed. Therefore, with this invention it is possible to obtain higher power at winds below design speed, and lower power above, relative to the conventional $V^3$ law. This in combination with the features of a synchronous generator which will have variable torque in accordance with the pre-determined desired speed of rotation will permit the control of the pre-swirl of the incoming wind so as to obtain the necessary torque for load and phase matching of the generator system to the grid to which it to be attached.

As will be readily appreciated by and after understanding of this invention it is desired to design for a zero exit swirl at a specified design and velocity, whereby the designer can easily select the rotor inflow angle distribution ($\phi$ r), as set forth by H. Glauert, "The Vortex Theory", Chapter LVI in Volume 4 of AERODYNAMIC THEORY, W. S. Durand, Editor in Chief, Dover, 1963, that gives a good working load distribution to all radial (span) stations of the monolithic rotor. Actually the design then involves the varying of the distribution of inflow angles characterized by the angle at the fourth (next to outermost) radial (span) station until the overall disk loading is at the optimum for the shroud system to which the turbine rotor is being matched. At this point the design has been fixed, so the diffuser augmented wind turbine system may operate through a specified range of wind speeds with the stator angle being adjusted for constant relative input flow angle to the constant speed monolithic rotor throughout the wind speed range.

The use of boundary layer control techniques for the diffuser walls and/or the centerbody structure has a still further advantage of permitting the shortest possible diffuser length and obtaining maximum augmentation thereby.

In essence then this invention for the first time combines a nonaerodynamic way of controlling a turbine rotational speed in the form of a synchronous generator that is combined with an aerodynamic control of the input swirl velocity to the turbine rotor in accordance with the sensing of wind pressure and/or velocity so as to accomplish constant speed control for the monolithic turbine rotor. It should be readily appreciated that across the disk area of the monolithic turbine rotor it is possible by proper design to achieve any desired distribution of work extraction along the blade span to produce desired flow conditions behind the turbine and that by the combination aforesaid the torque to the system will change with wind velocity but the rotational speed of the rotor will remain constant because of the characteristics of the synchronous generator.

Having set forth a operative description of this invention, it is now desired to set forth the intended protection sought by these letters patents in the appended claims:

What is claimed is:

1. A wind turbine comprising:
   a rotatable duct having an outlet to inlet area ratio greater than one;
   a wind-rotatable turbine mounted within said duct;
   a generator driven by said turbine, said generator being a synchronous generator loading the drive from the turbine; and
   stator means to vary the incidence of wind for rotating the turbine wherein the stator means includes a fixed leading portion and a trailing edge flap that is movable relative to the fixed leading portion, said trailing edge flap being movable by means sensitive to wind velocity to vary the swirl imparted to flow thereby providing a good working load distribution to all radial, span, stations of the turbine in optimizing disk loading for the turbine and the duct thereabout, so that with the load on the drive by the generator, constant turbine speed control can be effectuated over a wide range of wind velocities.

2. Means to match phase and control frequency of electricity from a wind generator, said means comprising:
   a monolithic turbine;
   a diffuser shrouding the noise of the turbine, said diffuser being mounted so as to adjust to varied wind directions;
   a synchronous generator driven by said turbine and providing as a result thereof a load for a turbine drive; and
   stator means adjacent an inlet of the diffuser ahead of and mounting said turbine and said synchronous generator within the diffuser, said stator means having controllable portions operating as a function of wind velocity to provide proper incidence of wind to said turbine for the loading thereof in obtaining constant rotor speed to thereby enable direct use of the synchronous generator output with any grid matching its phase and frequency.

3. The means of claim 2 wherein the diffuser has means to introduce external wind into the diffuser behind the rotor and at several places along the walls of the diffuser.

4. The means of claim 2 wherein the diffuser has means to introduce external wind into it behind the rotor and at several places along the walls of the diffuser.

5. The means of claim 2 wherein the diffuser has boundary layer control means within the length of the diffuser to optimize internal flow therethrough in preventing back flow blockage and thereby optimize extraction of the desired power of the monolithic turbine.

6. The means of claim 2 wherein the turbine is rotatably mounted by a symetrically streamlined center body supported by the stator means within which body behind said monolithic turbine is said generator.

7. The means of claim 6 wherein said center body is provided with flow control means to control flow through said duct means.

* * * * *